J. J. MÜLLER.
Apparatus for Saving Float Gold.
No. 208,535. Patented Oct. 1, 1878.
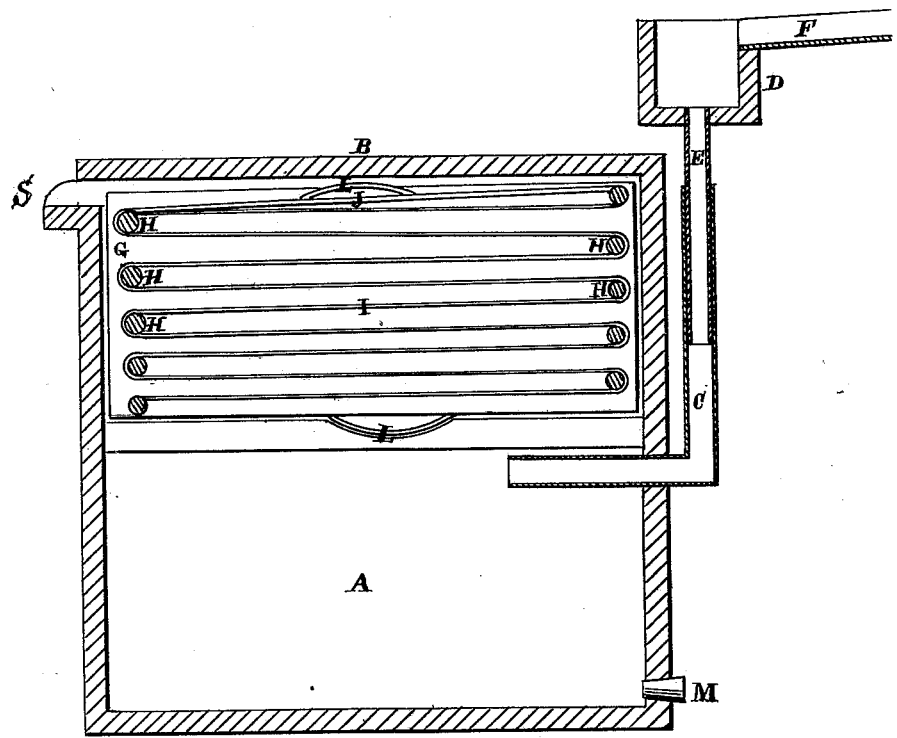
Witnesses
Geo. H. Strong
Frank A. Brooks
Inventor
Julius J. Müller
By Dewey & Co.
Attys

UNITED STATES PATENT OFFICE.

JULIUS J. MÜLLER, OF SAN FRANCISCO, CALIFORNIA.

IMPROVEMENT IN APPARATUS FOR SAVING FLOAT-GOLD.

Specification forming part of Letters Patent No. 208,535, dated October 1, 1878; application filed August 9, 1878.

*To all whom it may concern:*

Be it known that I, JULIUS JAMES MÜLLER, of the city and county of San Francisco, and State of California, have invented an Improved Apparatus for Saving Float-Gold; and I do hereby declare the following to be a full, clear, and exact description thereof, reference being had to the accompanying drawings.

My invention relates to an improved apparatus for saving the fine particles of gold which are found in suspension in the water from gravel or placer mines or quartz-mills. It consists in placing on a frame in a tank a series of blankets so arranged as to fill the upper portion of the tank, and leading the water containing the float-gold into the tank under the blankets, so it rises through the blankets, which allow the water to pass but catch the gold. Suitable devices are employed to retain the blankets in position firmly.

The supply-trough, into which the water is led, is connected with the tank by telescopic pipes, which admit of it being raised or lowered to regulate the pressure or head without having to connect or disconnect said pipes.

The drawing shows a section of my apparatus.

Let A represent a tank or receptacle, made in any desired form, and having a cover, B, by which it may be entirely closed, except as hereinafter described. At the rear of this tank are placed a series of pipes, C, which extend upward, as shown, and the lower ends of which enter the tank at a suitable distance above the bottom. At the rear end and above the tank is a trough, D, having, passing through its bottom, a series of pipes, E, corresponding in number to those in the tank. The pipes E fit inside of the pipes C, so that the two sets telescope, in order that the trough, with its pipes, may be raised or lowered without severing the continuity of the connection between the trough and tank. This is necessary in order that the head of water may be varied at will, so that the pressure on the blankets inside the tank may be regulated for the purpose hereinafter described. The water flows into the trough D through a sluice, F, from the place where the ore or gravel is worked. Inside of the tank is placed a frame composed of the sides G and rods or bars H, which extend about half-way down into the tank, and rests on lugs or supports provided for it. The pipes C enter the tank under the lower edge of this frame, so that the water may rise upward in the tank.

Across the rods or bars H is stretched a blanket, I, which passes continuously over a bar on one side, under the same bar, and over the one opposite, as shown, so as to form a continuous piece extending the depth of the frame. Across between the bars, or woven in with the blanket itself, are stretched wires J, which prevent the blankets bulging up or stretching out of place by the pressure of water underneath. The water passing up through the blankets passes out over the front edge of the tank through the opening S. Handles L are attached to the frame, so that it may be lifted out of the tank when it is desired to clean up the blankets or tank. A plug, M, in the tank may be removed when the tank needs cleaning.

The operation of my device is as follows: The water containing fine particles of gold in suspension from hydraulic washings or quartz-mills is led into the trough, the height of which above the tank is regulated to suit the required head or pressure, as described. The water passes down through the pipes into the tank under the blankets. In order to escape from the tank it must rise through the blankets, which catch in the passage all the float-gold suspended in the water. The blankets are held in place by the bars and wires; but the whole frame carrying the blankets may be removed by means of the handles. A separate box is provided, and is filled with water, for the purpose of cleansing the blankets. The frame may then be dipped up and down edgewise in the tank of water, so that the gold on the blankets may be washed into the box. The frame may then be reversed and again dipped edgewise, so that both sides of the blankets are washed and the gold received in the box, whence it may be removed when desired.

It is well known to miners that large quantities of gold in a finely-disseminated condition escape with the water used in working the ore or gravel. This is termed technically "float-gold," and will often remain in suspension when the earthy matters carried by the water have precipitated themselves. The phenomenon is commonly attributed to the fact that the particles of gold either have globules of air adhering to them or are covered with a greasy substance, which causes them to float, or else that the scales are so minute and "flakey" as to be of comparatively small specific gravity, so that the agitation of the water in motion keeps them in a state of suspension. Whatever the cause, the fact exists that large quantities of gold are lost to the miners by being carried off from the hydraulic-mines or quartz-mills in the water used to work the ore or gravel. Various devices have been invented for preventing this loss, most of them, however, having failed in attempting to bring the float-gold in contact with mercury, which it has been found practically impossible to do. Again, any agitation of the water prevents the gold from settling, and in bringing the float-gold in contact with mercury in any method yet devised an agitation of the water has been necessary.

With the device herein described, the water, being closely confined and having to rise up through the blankets to escape, is quieted, as it were, and the blankets effectually resist the passage of even the finest particles of gold. The water is not led into the device until it is comparatively free from mud or dirt, so that a small quantity only of débris will be found in the tank, which can be easily removed when desired. The peculiar formation of blankets has been found extremely advantageous in catching gold, the fine hairs catching in the ragged edges of the particles and detaining them. The interstices in the blankets, while admitting of the passage of water, prevent the gold from passing, and it is accordingly caught and saved.

This device is simple in construction and operation, requiring only occasional attention when cleaning up. The cover being secured, it cannot easily be reached except by those in charge, and the operation is continuous. The waste-water from sluices, flumes, or mills may be led through it, and a great saving of gold which would otherwise be lost can be effected. Whenever a sufficient amount of gold has accumulated upon the lower surface of the blanket it will either fall to the bottom of the tank, or, in case of the upper portions of the blanket, to the next below, from which it can be removed when a sufficient quantity has accumulated.

The object of the apparatus is to pass large quantities of water which carry but a limited quantity of sediment and some float-gold through the blankets, thereby effecting such a concentration of the material and fine gold that the latter may be easily separated and saved.

Having thus described my invention, what I claim as new, and desire to secure by Letters Patent, is—

1. The tank A, combined with its blanket-frame H, having the continuous blanket I passing back and forward within the frame, substantially as herein described.

2. The tank A, with its contained blanket-surfaces, as shown, and discharge-sluice S, in combination with the telescopic supply-pipes C E and elevated sluice T, said supply-pipes being capable of extension to regulate the head, substantially as herein described.

In witness whereof I hereunto set my hand.

JULIUS J. MÜLLER.

Witnesses:
FRANK A. BROOKS,
GEO. H. STRONG.